Feb. 21, 1928.

R. BEATTIE 1,660,248

PROCESS FOR MIXING SLUDGE

Filed June 6, 1927

Inventor
Robert Beattie
By M. S. Meem
Attorney

Patented Feb. 21, 1928.

1,660,248

UNITED STATES PATENT OFFICE.

ROBERT BEATTIE, OF FORT WORTH, TEXAS, ASSIGNOR TO TEXAS PACIFIC COAL AND OIL COMPANY, OF FORT WORTH, TEXAS, A CORPORATION OF TEXAS.

PROCESS FOR MIXING SLUDGE.

Application filed June 6, 1927. Serial No. 196,901.

This invention relates to an improved process and apparatus for mechanically mixing in any desired proportions, acid sludge or any other heavy residue remaining from the treatment of petroleum oils with fuel oil, gas oil or any other grade of hydrocarbons heavier than kerosene.

In order that the invention may be readily understood, it may be advantageous to give a short review of the production of acid sludges or residues. In the manufacture of lubricating oils, for instance, the elimination of undesirable asphaltenes and the improvement in the color of the oil is accomplished, by mechanically mixing the oil with sulphuric acid. The by-product of this mixing is acid sludge and heavy asphaltenes. This sludge is an accumulation of oxidized asphaltenes in a spongy cellular mass which settles in the bottom of the tank in which the treating takes place. The treated oil is decanted or pumped off, and the sludge drawn from the bottom of the tank.

This sludge has the following characteristics:

In structure, it ranges fom hard porous coke to a heavy viscous liquid, varied through this range by certain methods of treatment in the sludge forming process, and the amount of acid used. In weight, it has a specific gravity of from 1.3 to 2.4, depending again on the character of the oils treated, and the amount of acid used. As to the acidity, it may be stated that due to the spongy cellular structure of the sludge, the amount of acid carried off by the latter is very high. Products of oxidation are also present, but the acid content and structure are the only characteristics that affect the operation of the mixing apparatus forming part of the present invention. The heat content per pound of sludge runs from 10,000 to 16,000 B. t. u.'s. This also is a characteristic variable in each given instance. The combustibility on Flebert scale is lower than ordinary fuel oils, that is, the rate of propagation is from 10 to 30% lower than those encountered in ordinary combustion work. Aside from this latter physical property, the heavy asphaltenes in the sludge make a very good fuel.

Heretofore, acid sludge has been burned after coking, that is, after exposing the sludge to air or heat and breaking up the coke thus formed, and fixing the resulting pieces as solid fuel. Furthermore, within the last few years, efforts have been made to mix the sludge acid with a lighter fuel oil, and to then burn the mixture. In other cases, the acid sludge has been cooked with water to cause the acid present to be carried off, and the resultant acid free sludge has been mixed with fuel oil, in order that it might be burned. The latter is a very expensive operation, however, and the problem of disposing of the acid water has not been successfully met, unless the plant is at seaboard, and in such case, the acid water is dumped into the ocean, or if the plant is inland, the weak acid is turned over to a sulphuric acid recovery plant, and converted into commercial sulphuric acid.

The main objections to firing sludge as solid fuel, are, first, if hand fired, protection of fireman from acid burns is necessary; second, if stoker fired, the acid eats out the metal parts; third, in either instance, poor combustion, due to the sludge melting and running into grates, ash pits, etc.

Acid sludge in any degree of oxidization cannot be stored in a sludge pit or any other place without ruining that section of land for other purposes. Rain or surface water washes the acid out, and it in turn seeps into the surrounding soil. Any tank bottoms, concrete foundations, or in fact anything liable to be used for construction purposes, will sooner or later, to a certain degree, be attacked by this acid.

Apparently, the only logical way to dispose of acid sludge is to burn it, and to obtain the greatest efficiency for this purpose it should be in liquid form. This form permits atomization, a prime requisite for efficient combustion. The problems intendant with this plan are negligible compared with other methods of disposal.

As before stated, in the last few years efforts have been made to mix the acid sludge with fuel oil, for firing purposes, but such efforts have been unsuccessful, due to the fact that within a short time after the mixing, the sludge drops out of solution and settles to the bottom of the tank. There are several other objections to the procedure.

The primary object of the present invention is to improve the last mentioned system and to mechanically mix the acid sludge with fuel oil, gas oil or the like, in such manner that a homogeneous liquid remains, in which the acid is neutralized.

In approaching the problems connected with the mixing of acid sludge with fuel oil or the like for burning purposes, a study was made of the factors which caused the sludge to settle out after mixing. The only logical reason that this "settling out" phenomena could be attributed to is the following:

The minute cells in the sludge are filled with free acid. In the comparatively gentle mixing to which the ingredients have been subjected heretofore, these cells were not broken up but retained their original structure. After standing for some time in suspension, these cells released their acid charges. This releasing may have been due to the cell structure becoming porous and thus liberating the acid. At any rate, if such theory is true, and from experience, I believe it is, this liberated acid acted on the fuel in the mixture, and the resulting action formed new sludges, which in turn, in the absence of mechanical agitation, settled to the bottom of the storage tank.

A further object of my invention is to mechanically agitate the acid sludge so violently that its cells are broken up during the mixing, and the acid thus released is immediately neutralized by soda ash which has been previously mixed with gas oil or fuel oil, which in turn is mixed with the acid sludge.

A still further object of the invention is to furnish a process and apparatus which will not only mix the acid sludge and fuel oil or the like in such manner that the acid sludge will remain in suspension or solution, but the work will be accomplished in a comparatively short time, and the resulting mixture may be freely atomized for burning purposes.

With the foregoing objects outlined and with other objects in view which will appear as the description proceeds, the invention consists in the novel features and steps hereinafter described in detail, illustrated in the accompanying drawings, and more particularly pointed out in the appended claims.

Referring to the drawings.

Figure 1:
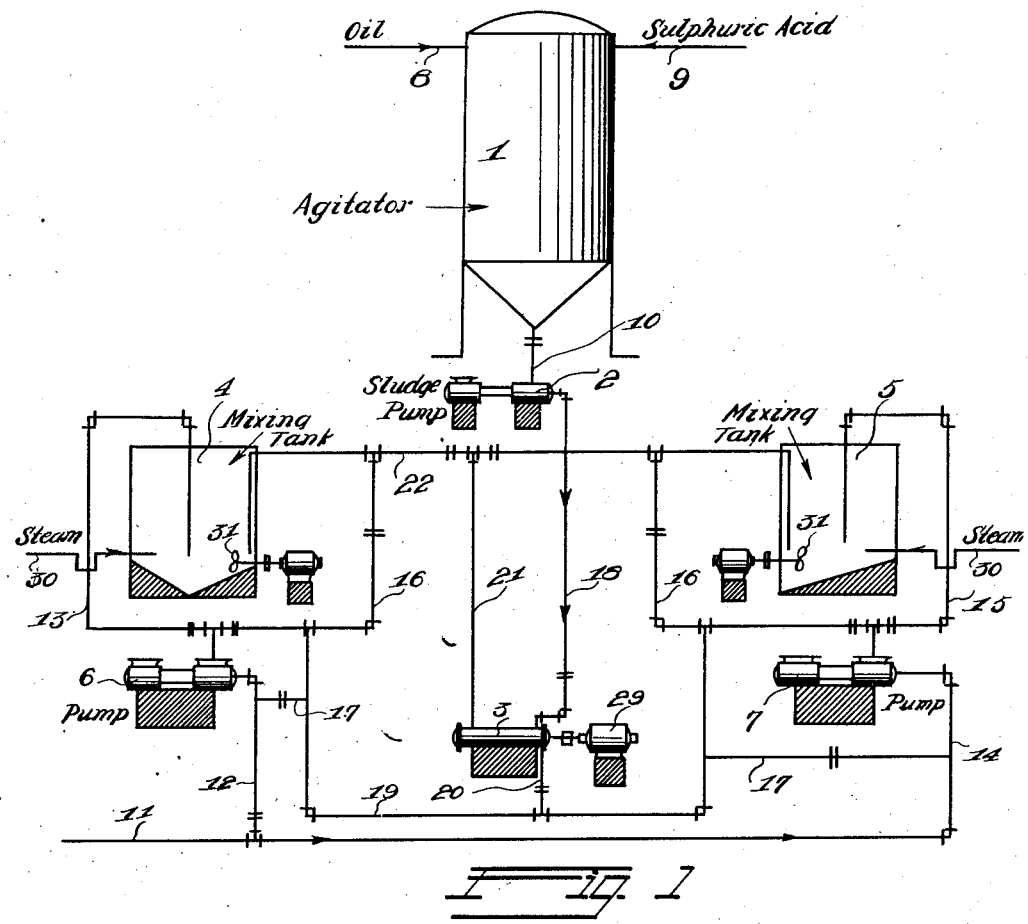
Fig. 1 is a diagrammatic view of my improved apparatus with which the new process may be carried out.

The apparatus consists mainly of an agitator 1, a sludge pump 2, a mixer 3, mixing tanks 4 and 5, and pumps 6 and 7, all suitably connected by valved piping in the manner hereinafter described.

In using this apparatus, the batch of oil to be treated is pumped into the agitator through a pipe 8, and after it is brought to the desired temperature, a measured amount of sulphuric acid is introduced into the oil through a line 9. Air is then blown into the pipe 10 at the bottom of the agitator, and the resulting agitation mixes the oil and acid. After a certain period, the air is shut off, and the sludge allowed to settle to the bottom.

As a general proposition, the oil in the agitator 1 is first treated with what is known as "cutter acid," and subsequently with "body acid," and my process and apparatus are designed to take care of such sequential treatments.

While the oil is being treated, or the sludge is settling in the agitator, a given amount of fuel oil, gas oil or other suitable hydrocarbon mixture, is fed through the pipe 11 by the pump 6, and passes by way of valved pipe 12 into that pump. The latter forces the liquid hydrocarbons through the valved pipe 13 into the tank 4, and the amount of liquid hydrocarbons fed into this tank will depend upon the amount of sludge obtained from the cutter acid.

If the total volume of cutter acid, sludge and fuel oil can be held in tank 4, tank 5 is charged with enough fuel oil to mix with the "body" sludge. If not, then the cutter sludge is split, part going to tank 4, and part to tank 5. In the latter instance, part of the gas oil or fuel oil will be drawn by the pump 7 through the valved pipe 14, and will be forced by the pump through the valved pipe 15 into the tank 5. Into these two tanks is dumped enough soda ash to completely neutralize the amount of acid in the sludge with which the fuel oil is to be mixed. While the sludge is settling in the agitator, and after the soda ash has been mixed with the fuel oil, this mixture of fuel oil and soda ash is moved around in cycles to thoroughly mix the same. To permit this, each tank and its associated pump is provided with valved pipes 16 and 17.

Assuming that the sludge has settled in the agitator by this time, the rotary mixer 3 is set in operation, and we will also assume that the mixture of fuel oil and soda ash in the tank 4 is sufficient to take care of this sludge which has resulted from the treatment of the oil with the cutter acid. Under such circumstances, the valve in the pipe 10 is opened, and the pump 2 functions to force the acid sludge from the pipe 10 through pipe 18 and into the mixer 3. At this time, the valves in the pipes 12 and 16 are closed, so that the pump 6 may force the mixture of fuel oil and soda ash through pipes 17, 19 and 20, from the tank 4 into the mixer 3, where it meets and is intermingled with the sludge from pipe 18. The mixture of soda ash, fuel oil and acid sludge is discharged from the mixer through pipe 21, and passes through pipe 22 into the tank 4.

Figure 2:
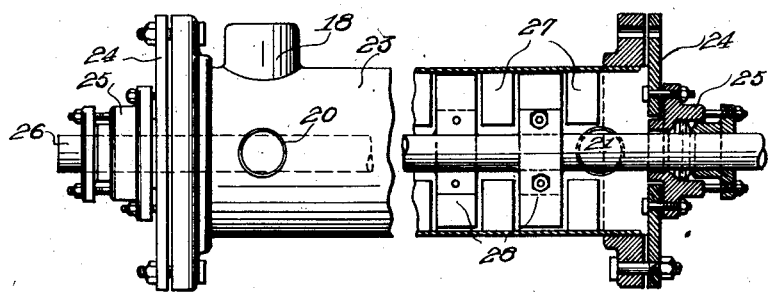
Fig. 2 is an elevation partly in longitudinal vertical section of the mechanical mixer forming part of the invention.

The mixer is shown in detail in Fig. 2, and it comprises a cylinder 23 having suitable inlet and outlet ports which communicate with the pipes 18, 20 and 21. Plates 24 close the ends of the cylinder and carry suitable bearings 25 for the shaft 26. The interior of the cylinder is provided with two rows of radially disposed stationary plates 27 which are diametrically oppositely disposed, and project into close proximity with the shaft 26. Arranged between these plates and fixed on the shaft 26, are rotatable plates 28. The shaft 26 is driven by any suitable means such as an electric motor 29, and the material passing through the mixer is violently agitated, so that the resulting mixture is a homogeneous liquid, in which the acid is neutralized.

While the soda ash is being mixed with the fuel oil, steam may be introduced into the tanks through pipes 30, and this will assist in maintaining the turbulence necessary to effectively mix these materials. If desired, rotatable propellers 31 may also be used to assist this action, but the use of the propellers is not necessary.

It may be observed that the acid sludge is forced by the pump 2, while the mixture of soda ash and fuel oil is circulated by the pump 6, and this permits the sludge to be put into the mixer with sufficient pressure to overcome the pressure caused by circulating the fuel oil and soda ash. The rate of circulation of the soda ash fuel oil is so high in comparison to the inlet rate of sludge (ratio 100 to 1), and the agitation is so violent, that the acid bearing sludge cells are ruptured, their acid released, and immediately neutralized by the presence of the soda ash carried by the fuel oil.

At the beginning of the actual mixing, a quantity of acid oil is drawn from the bottom of the agitator before the sludge comes. This oil is rich in acid which is neutralized immediately when introduced into the mixer, as the fuel oil at this step of the operation is laden with strong soda ash. As the operation progresses, the fuel oil becomes more and more sludge laden, and after all the sludge is pumped into the mixer, the sludge pump is shut down. A suitable mixture of sludge acid and fuel oil is circulated through the mixer by the pump 6, until smoothness is obtained, (freedom from sludge and coke particles).

The body sludge formed by the second acid charge is then mixed in tank 5, that is, circulated by pump 7 through the mixer. During this operation, the contents of tank 4 may be pumped to storage, and then be recharged with fuel oil or the like for the next operation. In effect, it will therefore be seen that my process and apparatus renders the operation substantially continuous.

The shaft of the mixer 3 is rotated at a high rate of speed so as to secure the desired result, and the operation of the mixer positively prevents the formation of any secondary sludges in the resulting mixture.

The same type of mixer may be used to work up the sludge already in storage in sludge pits at refineries.

Whenever the mixer is employed for the treatment of sludge, there is bound to be drawn to the outer wall of the cylinder 23, during the mixing process, such parts of the mixture as contains the greater percentage of sludge; this throwing out or stratification being due to centrifugal force. This is the part of the mixture then at any given moment that requires the most agitation to make the finished product homogeneous.

As it is a mathematical law that the peripheral speed is direct, dependent on the R. P. M., and the distance of point to the center of rotation, automatically, the areas farthest away from the shaft receive the most energetic agitation. It is thus evident, in the course of the ingredients through the mixer, this condition balances itself, and the resulting acid sludge fuel is homogeneous regardless of the rate of charging.

In the beginning, I tried this mixer with fuel oil, but subsequently, I have successfully used the same for mixing gas oil and sludge, which was impossible by the known method, due to the fact that the acid sludge when introduced into gas oil, even in small particles, immediately sank to the bottom of the mixing tank. Because of the mixing and disrupting action in my new system, the sludge, by the time it passed into the tank via the mixer, was in suspension in the gas oil, and readily mixed with gas oil in the tank.

While I have disclosed a working embodiment of the invention, it will be apparent to those skilled in the art that changes may be made in the details disclosed without departing from the spirit of the invention as expressed in the claims.

What I claim and desire to secure by Letters Patent is:

1. A process for treating acid sludge and like residues, consisting in mixing the same with liquid hydrocarbons, flowing the mixture through a passageway and agitating the flowing mixture in said passageway with sufficient violence to produce a homogeneous liquid mixture.

2. A process for treating acid sludge or the like, consisting in mixing such sludge with liquid hydrocarbons heavier than kerosene, flowing the mixture through a passageway and agitating the flowing mixture in said passageway with sufficient violence to produce a homogeneous liquid mixture.

3. A process of treating acid sludge or the like, consisting in mixing the same with liquid hydrocarbons and a neutralizing agent, flowing the mixture through a passageway and agitating such mixture in said passageway with sufficient violence to produce a homogeneous liquid mixture in which the acid is neutralized.

4. A process of treating acid sludge or the like, consisting in mixing the same with liquid hydrocarbons heavier than kerosene, and a neutralizing agent, flowing said mixture through a passageway and agitating such mixture in said passageway with sufficient violence to produce a homogeneous liquid mixture in which the acid is neutralized.

5. A process for treating acid sludge or the like, consisting in mixing the same with liquid hydrocarbons and soda ash, flowing the mixture through a passageway and agitating the mixture in said passageway with sufficient violence to produce a homogeneous liquid mixture in which the acid is neutralized.

6. A process for treating acid sludge and the like, consisting in mixing the same with liquid hydrocarbons and a neutralizing agent, flowing said mixture through a passageway, and mechanically agitating the mixture in said passageway to produce a homogeneous liquid mixture in which the acid is neutralized.

7. A process of treating acid sludge or the like, consisting in mixing the same with liquid hydrocarbons and a neutralizing agent, organizing said mixture into a stream and beating said mixture in said stream with sufficient violence to produce a homogeneous liquid mixture in which the acid is neutralized.

8. In a process of the character described, mixing liquid hydrocarbons and soda ash, subsequently mixing this mixture with acid sludge, flowing the resulting mixture through a passageway and mechanically agitating the resulting mixture in said passageway with sufficient violence to produce a homogeneous liquid mixture in which the acid is neutralized.

9. A process of the character described, consisting in mixing a predetermined quantity of liquid hydrocarbons with a neutralizing agent, subsequently mixing such mixture with a smaller quantity of acid sludge, organizing the resulting mixture into a flowing stream and mechanically agitating the resulting mixture in a stream with sufficient violence to produce a homogeneous liquid mixture in which the various ingredients remain in solution.

10. A process for treating acid sludge or the like, consisting in mixing the same with liquid hydrocarbons and a neutralizing agent, organizing the mixture into a flowing stream, and agitating the mixture in said stream with such violence that the acid bearing sludge cells are broken up and the acid released therefrom, and permitting the acid thus released to be immediately neutralized by the neutralizing agent.

11. A process for treating acid sludge and the like, consisting in mixing the same with liquid hydrocarbons and a neutralizing agent, and beating the mixture with sufficient violence and at such high speed as to break up all the acid bearing sludge cells and to release the acid therefrom, the neutralizing agent being in sufficient amount to completely neutralize the released acid.

12. A process for treating acid sludge or the like, consisting in mixing relatively small quantities of the same with relatively large quantities of liquid hydrocarbons and soda ash, mechanically agitating said mixture with such violence that all the acid bearing sludge cells are broken up and the acid is released therefrom, and completely neutralizing the acid thus released by said neutralizing agent.

13. In a process of the character described, mixing hydrocarbon oil with acid, allowing the resulting sludge to settle, then introducing the sludge into a flowing stream of hydrocarbon oil, and agitating the mixture in said stream with such violence that the acid bearing sludge cells are broken up and the acid released therefrom, and introducing a sufficient quantity of a neutralizing agent into said mixture to cause the released acid to be completely neutralized by said neutralizing agent.

14. A process for treating acid sludge and the like, consisting in contacting a moving stream of acid sludge with a moving stream of liquid hydrocarbons and a neutralizing agent, mixing these streams and organizing them into a common stream, and agitating the resulting mixture in said common stream with sufficient violence to produce a homogeneous liquid mixture in which the various ingredients remain in solution.

15. A process for treating acid sludge and the like, consisting in flowing a stream of acid sludge and a stream of liquid hydrocarbons and a neutralizing agent, through a passageway, and agitating the mixture in said passageway with such violence as to produce a homogeneous liquid mixture in which the various ingredients remain in solution.

16. A process of treating acid sludge and the like, consisting in introducing relatively small quantities of acid sludge into a much larger quantity of liquid hydrocarbons and a neutralizing agent, and agitating the resulting mixture with sufficient violence and at such high speed as to produce a homogeneous liquid mixture in which the various ingredients remain in solution.

17. A process of treating acid sludge and the like, consisting in contacting a moving stream of acid sludge with a moving stream of liquid hydrocarbons and a neutralizing agent, maintaining the rate of flow of the stream of liquid hydrocarbons and neutralizing agent extremely high in comparison with the rate of flow of the stream of acid sludge, organizing said streams into a common stream, and agitating the resulting mixture in said common stream so violently and with such speed that the acid bearing sludge cells are ruptured, their acid released, and said acid immediately neutralized by the presence of the neutralizing agent.

ROBERT BEATTIE.